United States Patent
Zhao et al.

(10) Patent No.: US 6,748,331 B1
(45) Date of Patent: Jun. 8, 2004

(54) COMPUTER ASSISTED IDENTIFICATION OF FILAMENTOUS BACTERIA

(75) Inventors: Qin Zhao, Plano, TX (US); Gerald E. Wilson, Stillwater, OK (US); Christopher K. Campana, Hope, NJ (US); Enos L. Stover, Stillwater, OK (US)

(73) Assignee: Stover & Associates, Inc., Stillwater, OK (US)

( * ) Notice: Subject to any disclaimer, the term of this patent is extended or adjusted under 35 U.S.C. 154(b) by 0 days.

(21) Appl. No.: 09/807,014

(22) PCT Filed: Oct. 6, 1999

(86) PCT No.: PCT/US99/23275

§ 371 (c)(1),
(2), (4) Date: Sep. 20, 2001

(87) PCT Pub. No.: WO00/21018

PCT Pub. Date: Apr. 13, 2000

Related U.S. Application Data

(60) Provisional application No. 60/103,462, filed on Oct. 7, 1998.

(51) Int. Cl.[7] ............................. G06F 19/00; C12Q 1/04; G01N 1/30
(52) U.S. Cl. ............................ 702/19; 435/34; 435/40.5
(58) Field of Search .............................. 702/19; 435/34, 435/40.5

(56) References Cited

U.S. PATENT DOCUMENTS 4,199,748 A    4/1980    Bacus

OTHER PUBLICATIONS

Williams et al. Isolation and characterization of filamentous bacteria present in bulking activated sludge. Appl. Microbiol. Biotechnol. vol. 22, pp. 273–282 (1985).*

Robin L. Brigmon, Gabriel Bitton, Stephen G. Zam, Harris W. Martin and Bonnie O'Brien; "Identification, Enrichment, and Isolation of Thiothrix ssp. From Environmental Samples*"; Current Microbiology vol. 28 (1994), pp. 243–246.

Monika Emmrich Manfred Ziegler and Henning Ruden; "Filamentous Bacteria in Activated Sludge (Bulking Sludge)"; Zbl. Bakt. Hyg., I. Abt. Orig. B 177, 436–450 (1983).

* cited by examiner

*Primary Examiner*—John S. Brusca
(74) *Attorney, Agent, or Firm*—Crowe & Dunlevy, P.C.

(57) ABSTRACT

Method and apparatus for identifying a filamentous organism of the type present in a biological waste water treatment process. A magnified image of an unstained filamentous organism is obtained (122, 124), and initially evaluated for the presence or absence of attached growth and the presence or absence of sulfur granules (142). A computer routine (140) resident in a computer workstation (104) is executed which, for each combination of the presence or of attached growth and the presence or absence of sulfur granules, provides a separate user interactive search tree (144, 146, 148, 150), each search tree leading to a different set of possible types of filamentous organism.

17 Claims, 7 Drawing Sheets

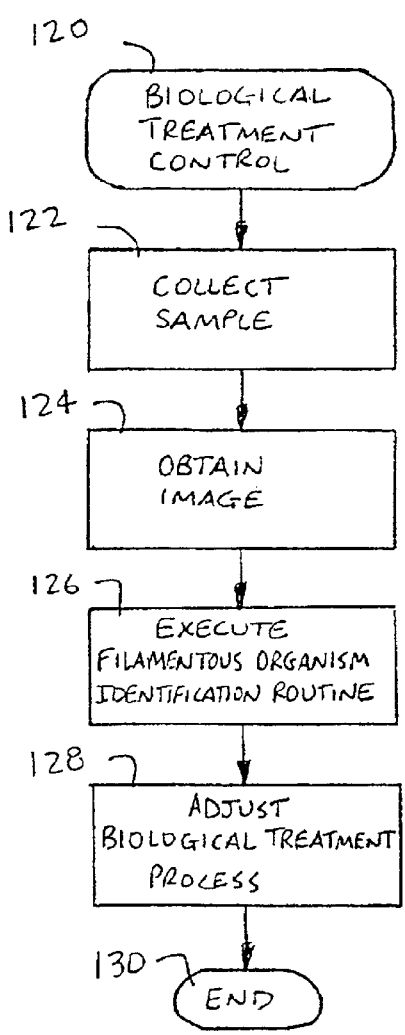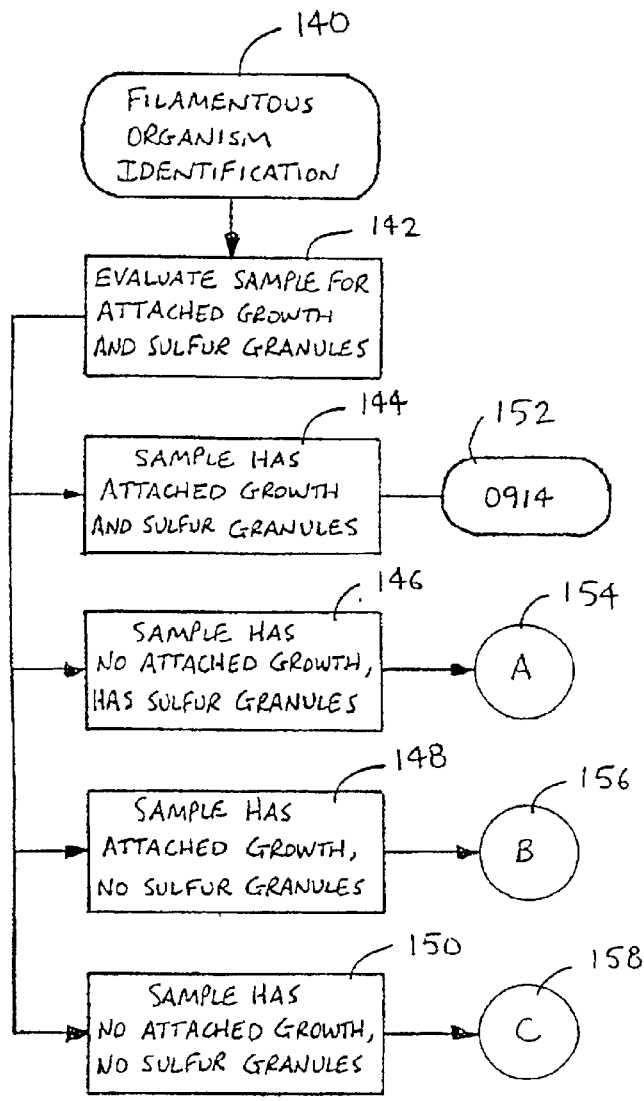
FIG. 2
FIG. 3

COMPUTER ASSISTED IDENTIFICATION OF FILAMENTOUS BACTERIA

This application claims the benefit of U.S. Provisional Application No. 60/103,462, filed Oct. 7, 1998.

FIELD OF THE INVENTION

This invention relates generally to the field of biological waste water treatment processes and more particularly, but not by way of limitation, to the identification of a filamentous organism in a biological sample.

BACKGROUND OF THE INVENTION

Filamentous organisms (filamentous bacteria) are very important to the biological process that occurs in a wastewater treatment plant. They form a backbone for activated sludge floc which helps the sludge settle in the secondary clarifier. However, excessive filamentous bacteria can cause bulking and foaming in the biological process. Research has indicated that various bulking and foaming problems are caused by the type and amount of filamentous bacteria present.

Therefore, correctly identifying filamentous bacteria in biological treatment processes, especially in activated sludge, is very important for proper diagnosis of a specific bulking or foaming problem. It is the necessary first step in bulking and foaming control. Certain filaments are associated with particular operational conditions. These bacteria can be, for instance, sulfur oxidizing filaments, low dissolved oxygen filaments, or low food to microorganism ratio (F/M) filaments. Different filaments require different control methods. Correct typing of filamentous bacteria gives an operator additional knowledge with which to design the proper control for bulking and foaming in the wastewater treatment plant.

Typing of filamentous bacteria is presently conducted using a microscope. Under the microscope, each filamentous organism is characterized using a number of parameters. These parameters include branching, motility, filament shape, filament location, attached growth, sheath, crosswalls, filament diameter, filament length, cell shape, cell size, presence of sulfur deposits, presence of other granules, Gram stain and Neisser stain. In total, 15 parameters have been identified. Based on information from Eikelboom and van Buijsen, Jenkins et al. provide a short description for each of the 29 filamentous organisms commonly observed in activated sludge in their *Manual on the Causes and Control of Activated Sludge Bulking and Foaming*, Jenkins et al., 1993. Prior art methods of identifying filaments involve matching the observed filament characteristics with the short descriptions provided in the *Manual on the Causes and Control of Activated Sludge Bulking and Foaming*, Jenkins et al., 1993. The procedure described in this manual to identify each filamentous organism in a wastewater sample is widely used by wastewater treatment personnel.

The key point in identifying a filamentous organism is to match the unique set of 15 characteristics with one of the 29 filaments provided in the Jenkins et al. manual. Among the 29 filaments, many of them have similar characteristics and some of the filaments are differentiated by only a few parameters. Therefore, the matching process requires experience. For an experienced observer using prior art techniques, it normally takes about two hours to type one sample. Among wastewater treatment plant operators and environmental engineers, there are only a few who have sufficient knowledge of the multiple typing considerations to type filaments correctly and expediently. Therefore, there is a need for improvements in the art to assist typing observers in quickly and reliably identifying filamentous bacteria.

SUMMARY OF THE INVENTION

The present invention is directed to an apparatus and method for identifying a filamentous organism of the type present in a biological waste water treatment process.

In accordance with preferred embodiments, a magnified image of an unstained filamentous organism is obtained, and initially evaluated for the presence or absence of attached growth and the presence or absence of sulfur granules.

A computer routine resident in a computer workstation is executed which, for each combination of the presence or absence of attached growth and the presence or absence of sulfur granules, provides a separate user interactive search tree, each search tree leading to a different set of possible types of filamentous organisms. The routine preferably displays digital images showing representations of each of the four possible combinations of the foregoing parameters. Based on user selection of what is observed in the sample, the routine presents successive screens with further options which most closely correlate with what is observed in the magnified image, ultimately leading the user (via multiple paths in many cases) to the final identification of the filamentous organism in an efficient and reliable manner.

Using the search tree associated with the combination of the presence of attached growth and the presence of sulfur granules, the filamentous organism is readily identified as type 0914. The search tree associated with the combination of the absence of attached growth and the presence of sulfur granules leads to identification of the filamentous organism as a selected one of the following five types: 0914, 021N, Beggiatoa, Thiothrix I or Thiothrix II, based on additional observation of physical characteristics in the unstained sample.

The search tree associated with the combination of the presence of attached growth and the absence of sulfur granules leads to the identification of the filamentous organism as a selected one of the following seven types: 0041, 0675, 0914, 1701, 1851, *H. Hydrossis* or *S. Natans*, based on additional observation of physical characteristics in the unstained sample.

Finally, when neither attached growth nor sulfur granules are present in the sample, the associated search tree leads to the identification of the filamentous organism as a selected one of the following 23 types: 0041, 0092, 021N, 0411, 0581, 0675, 0803, 0914, 0961, 1701, 1851, 1863, Beggiatoa, Flexibacter, *H. Hydrossis*, Limicola I, Limicola II, Limicola III, *M. Parvicella*, Nocardia ssp., *S. Natans*, Thiothrix I or Thiothrix II. Most of these filamentous organisms can be identified based on observed physical characteristics without the need for extensive, time consuming identification methods, such as Neisser and Gram staining.

These and various other features and advantages which characterize the present invention will be apparent from a reading of the following detailed description and a review of the associated drawings.

BRIEF DESCRIPTION OF THE DRAWINGS

FIG. 3-1 through 3-5 provide continuations of the various search trees of the routine of FIG. 3.

DETAILED DESCRIPTION

Figure 1:
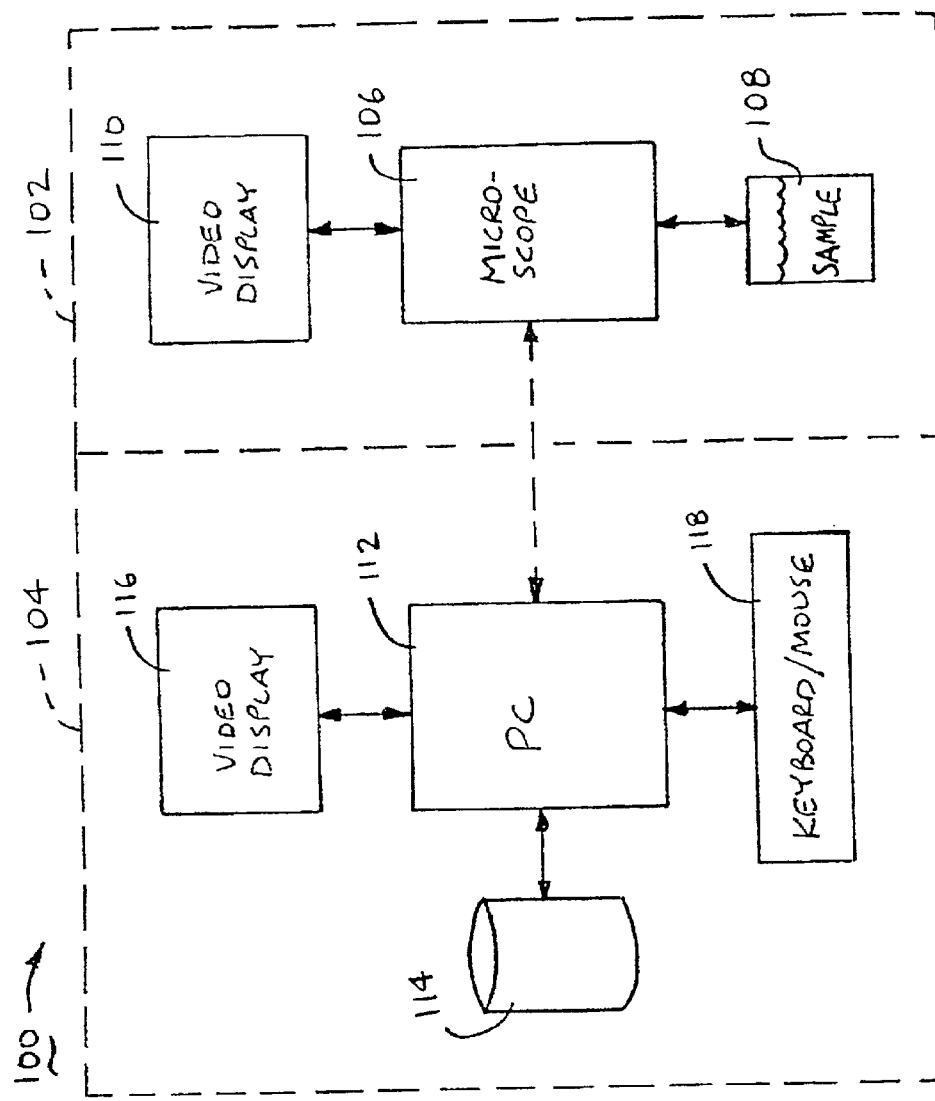
FIG. 1 provides a functional block diagram of a filamentous organism identification system, constructed in accordance with preferred embodiments of the present invention.

Referring now to the drawings, FIG. 1 provides a functional block diagram of a filamentous organism identification system 100, constructed in accordance with preferred embodiments of the present invention. The system 100 comprises two primary components: a conventional microscope station 102 and a computer workstation 104.

The microscope station 102 includes a microscope 106 capable of providing at least 1000× magnification of organisms present in a biological sample 108. The microscope 106 is preferably configured to capture a video image of the sample 108 and output the same to a video display 110, although such capabilities are not necessary.

The computer workstation 104 includes a personal computer (PC) 112 with associated data storage device (such as a disc drive) 114, video display 116 and keyboard/mouse 118 to enable a user to execute a filamentous organism identification routine, as discussed below. Although separate video displays 110, 116 have been represented in FIG. 1, in an alternative preferred embodiment, the display 110 is eliminated and the image from the microscope 106 is ported to the PC 112 and displayed as a part of the screens projected by the video display 116 during execution of the filamentous organism identification routine.

As discussed above, a liquid stream activated sludge waste water treatment process employs an aeration basin and a secondary clarifier. Biological agents in the aeration basin remove and transform soluble and particulate pollutants. These agents are referred to as activated sludge, and include filamentous organisms (also referred to as "filamentous bacteria"). As will be recognized, the types and amounts of filamentous organisms are major factors in determining the settling and compacting characteristics of the activated sludge.

Various modifications and modes of operation exist for the activated sludge process. Also, various fixed-film biological processes (e.g., biotowers and rotating biological contractors) are used for waste water treatment. Filamentous organism identification is also very beneficial to operation of these processes.

Figures 1, 3:
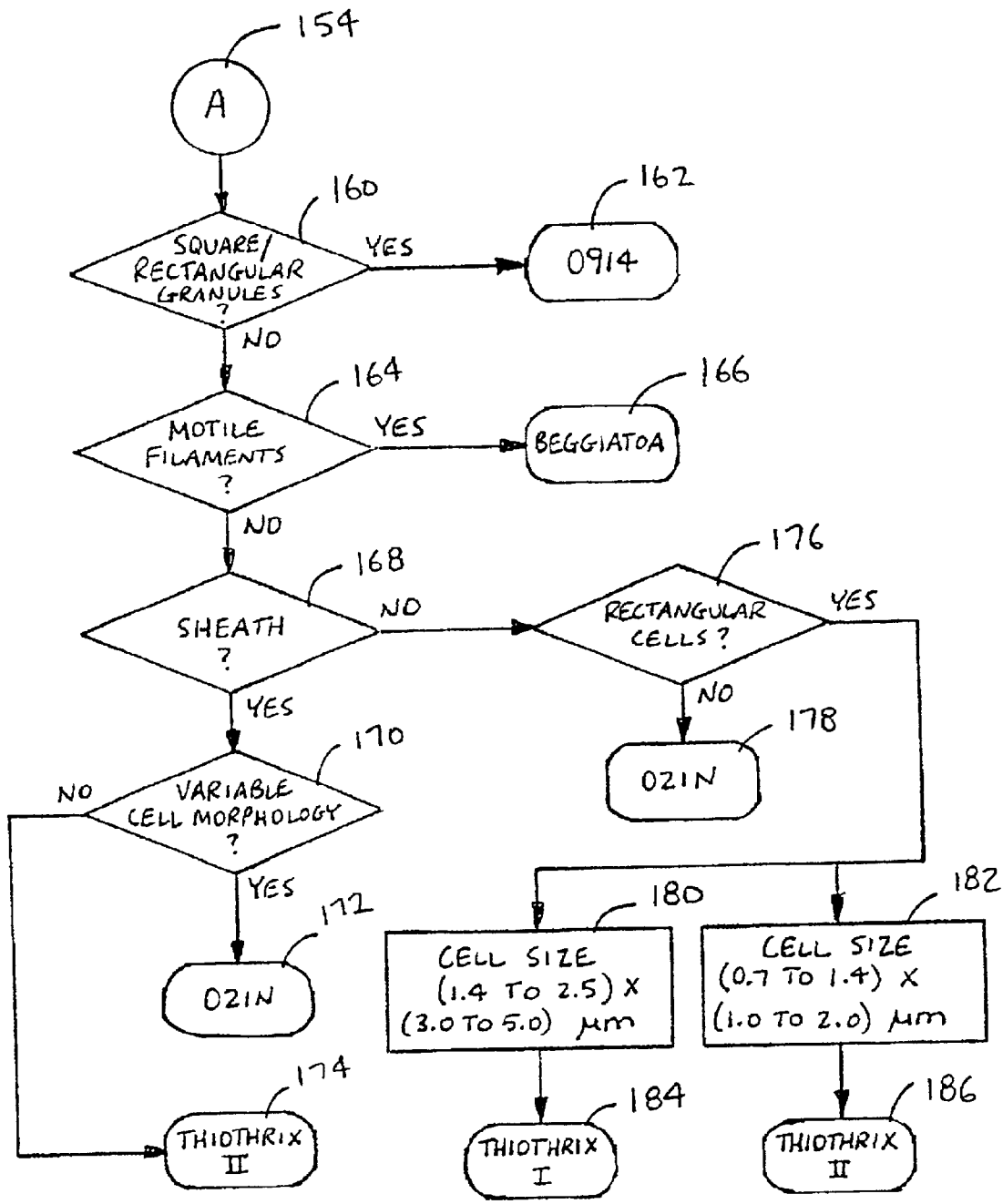
FIG. 3 is a flow chart for a FILAMENTOUS ORGANISM IDENTIFICATION routine, representative of programming stored and executed by the computer workstation of FIG. 1 and illustrating four different search trees based on the presence or absence of attached growth and sulfur granules in the magnified image.
Figures 2, 3:
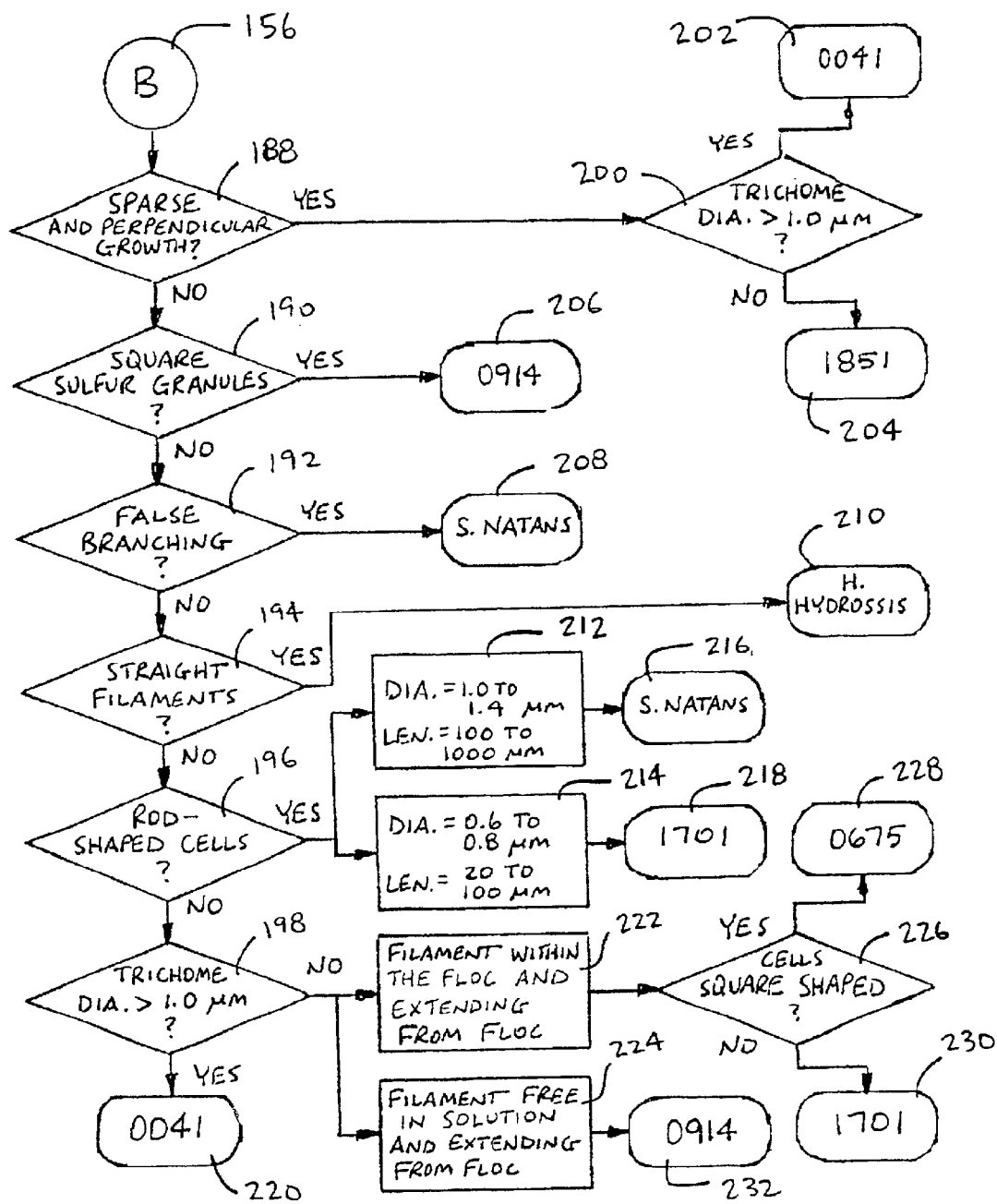
FIG. 2 is a flow chart for a BIOLOGICAL TREATMENT CONTROL routine, illustrating steps carried out in accordance with the preferred embodiments to control a biological waste water treatment process.
Figure 3:
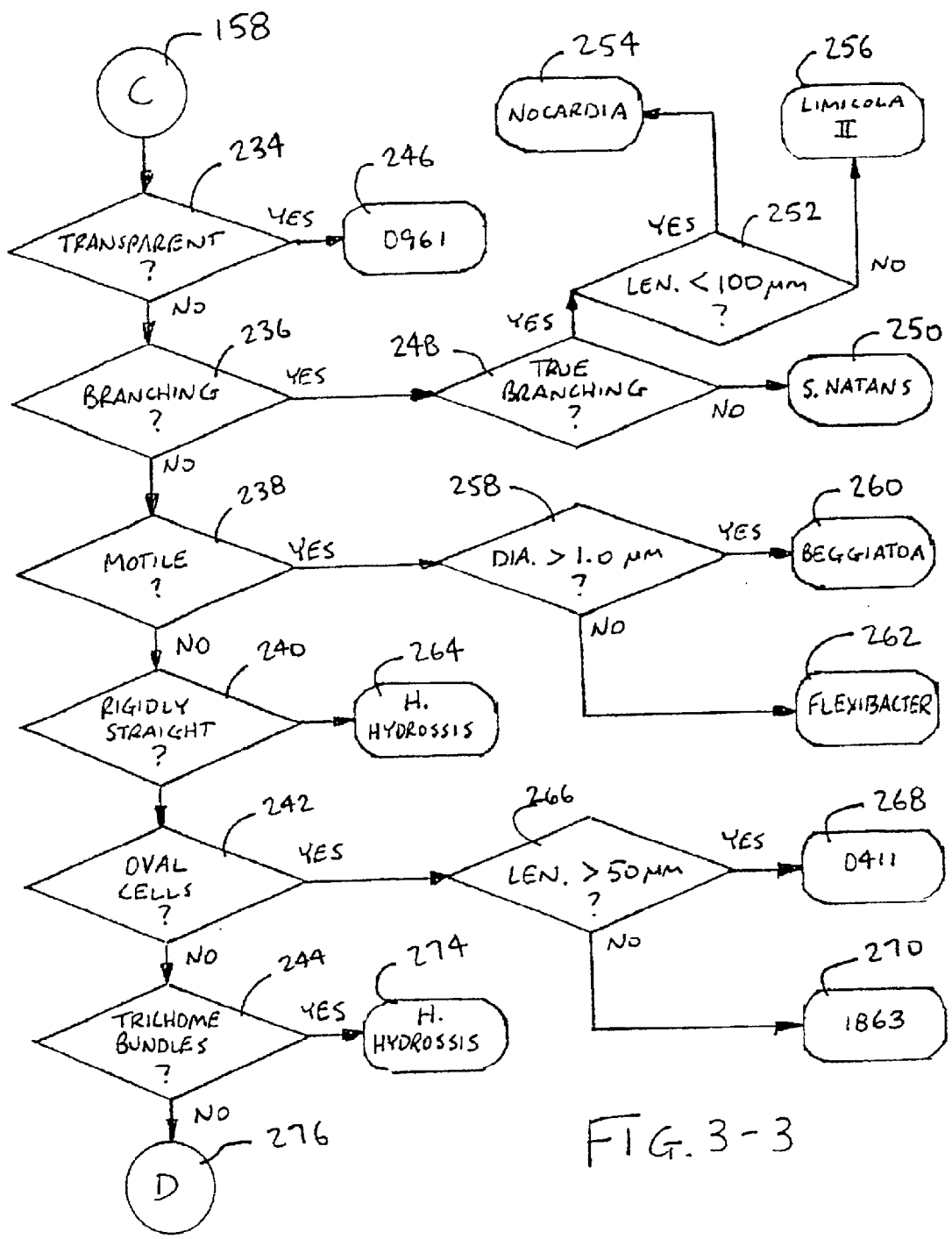

Accordingly, FIG. 2 provides a BIOLOGICAL TREATMENT CONTROL routine 120, generally setting forth the steps carried out to control the operational characteristics of a biological waste water treatment process, such as an activated sludge process. At step 122, a sample of the activated sludge (such as the sample 108) is collected from the aeration basin, and a magnified image thereof is obtained at step 124.

At step 126, the aforementioned computer-based filamentous organism identification routine is executed to identify the type or types of filamentous organisms present in the sample. Once identified, these data, as well as other significant parametric inputs (such as temperature, foam characteristics, etc.) are used to adjust the process, after which the routine ends at step 130.

FIGS. 3, 3-1 through 3-5 provide a basic flow for the filamentous organism identification routine (generally denoted at 140). It will be recognized that the routine 140 is preferably stored in the data storage device 114 and executed by the user using the keyboard/mouse 118. The routine is preferably run in a Microsoft Corporation Windows 95/98/NT® environment. During execution, a sequence of interactive screens are displayed by the video display 116 and accessed by the user using radio buttons selectable by the mouse or keyboard to enable the user to quickly and accurately identify the filamentous organism or organisms in the sample 108.

Before proceeding with a detailed discussion of the flow of the routine 140, it will be helpful to first give an overview of the routine. The routine has the capability of identifying 23 filamentous organisms commonly observed in activated sludge processes. These organisms are listed in Table I.

TABLE I

| Filamentous Organism Types |
| --- |
| 0041 |
| 0092 |
| 021N |
| 0411 |
| 0581 |
| 0675 |
| 0803 |
| 0914 |
| 0961 |
| 1701 |
| 1851 |
| 1863 |
| Beggiatoa |
| Flexibacter |
| H. Hydrossis |
| Limicola I |
| Limicola II |
| Limicola III |
| M Parvicella |
| Nocardia ssp. |
| S. Natans |
| Thiothrix I |
| Thiothrix II |

The infrequently observed filament types (1702, 1852 and 0211) are not identified by the routine. Fungi, Cyanophyceae and Bacillus spp. are easily identified, and so are not included as well in the operation of the routine. Representative digital images, however, are preferably available for all 29 types of filamentous organisms for user reference.

Generally, the routine 140 provides four independent search trees, based on initially observed characteristics of the filamentous organism regarding the presence or absence of sulfur granules and attached growth (i.e., bacterial growth attached to the sheath of a trichome). Digital images are displayed in the first screen showing representations of each of the four possible combinations of the foregoing parameters. Based on user selection of what is observed in the sample 108, the routine presents successive screens with further options which most closely correlate with what is observed using the microscope 106, ultimately leading the user (via multiple paths in many cases) to the final identification of the filamentous organism.

Preferably, a bottom menu bar is displayed on the display 116 to provide both information and action functions to the user. The possible filaments which may be identified at any point during the program are listed. Thus, after initial execution of the routine the user sees the following text: "Possible Filaments: ALL FILAMENTS," and this is narrowed down as the user navigates through the routine 140 by selecting keyboard/mouse activated buttons until only one filament type remains. Keyboard/mouse activated buttons also provide the user with additional features, such as navigation buttons, a help file, organism libraries, definitions, and report options, all of which can be readily constructed by those skilled in the art.

Returning now to the flow of FIG. 3, after evaluation of the organisms in the sample 108 for the presence or absence of attached growth and sulfur granules (as indicated by step 142), the user is instructed to select one of four possible combinations, which are set forth by respective steps 144 (attached growth, sulfur granules); 146 (no attached growth, sulfur granules); 148 (attached growth, no sulfur granules); and 150 (no attached growth, no sulfur granules). Digital images of each of these combinations are displayed on the screen, allowing for easy comparison with the sample 108. In this way, a majority of the 23 filamentous organisms can be easily and accurately identified without the need for additional, time-consuming evaluation techniques (such as Neisser and Gram staining), greatly reducing the time required to identify most filaments.

As shown in FIG. 3, the result of selection of the attached growth and sulfur granules combination of step 144, the routine 140 proceeds to positive identification of the sample 108 as containing filamentous bacteria type 0914, at step 152 (and the routine ends at this point). The remaining combinations 146, 148 and 150, however, lead to additional screens which will now be discussed in turn. For clarity, connection points labeled "A," "B," and "C" are identified at 154, 156 and 158, respectively.

Turning to FIG. 3-1, the steps carried out in response to selection of the no attached growth/with sulfur granules combination (step 146, FIG. 3) will now be discussed. Decision step 160 inquires whether the observed sulfur granules exhibit square or rectangular shapes. If so, the routine continues to the positive identification of the filamentous organism as type 0914 at step 162. Otherwise, the user is next directed to determine whether motile filaments are present in the sample 108, as indicated by decision step 164. Motility refers to the ability of the sample organism to move independently, usually by flexing and gliding When such motile filaments are present, the routine proceeds to positively identify the sample 108 as Beggiatoa, as indicated by step 166.

When no such motile filaments are present, the routine continues to decision step 168, to determine the presence or absence of a sheath (i.e., a clear structure exterior to the cell walls). If a sheath is present, the routine continues to decision step 170 which determines whether variable cell morphology (i.e., variation in the structure and form of the organisms) is present. Such variable morphology leads to the positive identification of the filamentous organism as type 021N (step 172); the absence of such variable morphology leads to the positive identification of the organism as type Thiothrix II (step 174).

Returning to decision step 168, when no sheath is present the routine continues to decision step 176 which inquires whether the cells are rectangular in shape. If not, type 021N is positively identified at step 178. If the cells are rectangular, a dimensional analysis of the cells becomes necessary and the user is prompted with two options: a larger size of (1.4 to 2.5)×(3.0 to 5.0) micrometers ($\mu$m), as shown by step 180, and a smaller size of (0.7 to 1.4)×(1.0 to 2.0) $\mu$m, as shown by step 182. When the user selects the larger size, the filamentous organism is positively identified as Thiothrix I (step 184); when the user selects the smaller size, the organism is positively identified as Thiothrix II (step 186). Thus, it will now be apparent that election of the combination of no attached growth and with sulfur granules (step 146, FIG. 3) ultimately leads to the possible identification of five of the 23 filament types: 0914, 021N, Beggiatoa, and Thiothrix I and II. Each of the foregoing branches of the routine are preferably added to the screen in response to the previous selection by the user.

Returning again to FIG. 3, the steps carried out in response to election by the user of the attached growth/no sulfur granules of step 148 will now be discussed. FIG. 3-2 preferably represents a second screen displayed by the video display 116 that replaces the main screen initially displayed to show the four options of FIG. 3. This second screen enables the user to select among six possible, mutually exclusive features present in the sample 108: sparse and perpendicular growth (decision step 188); square sulfur granules (decision step 190); false branching (decision step 192); straight filaments (decision step 194); rod-shaped cells (decision step 196); and trichome diameter (decision step 198). Representative digital images of each of these characteristics are preferably displayed on this screen to aid the user in making these determinations.

The presence of sparse and perpendicular growth (decision step 188) leads to a dimensional inquiry regarding the diameter of the observed trichome, as represented by decision step 200. As will be recognized, a trichome is the outer support structure containing the internal components of the filamentous microorganism. Accordingly, if the diameter of the observed trichome is greater than 1.0 $\mu$m, the organism is positively identified as type 0041 at step 202; if the diameter is less than 1.0 $\mu$m, the organism is positively identified as type 1851 at step 204.

The presence of square sulfur granules (decision step 190) leads to the positive identification of the sample as type 0914 at step 206. In passing, it will now be noted that type 0914 has been identified (thus far) using three different paths. One of the advantages of the routine 140 is such multi-path capabilities for many of the different types of filamentous organisms identified by the routine, leading to highly accurate sample evaluation.

Continuing with FIG. 3-2, the presence of false branching (decision step 192) leads to the positive identification of the organism as type *S. Natans* at step 208, and the presence of straight filaments (decision step 194) leads the positive identification of type *H. Hydrossis* at step 210.

When rod-shaped cells are present (decision step 196), a dimensional analysis is requested by the user to determine whether the filaments exhibit a larger size (diameter of 1.0 to 1.4 $\mu$m and length of 100 to 1000 $\mu$m), as shown by step 212, or a smaller size (diameter of 0.6 to 0.8 $\mu$m and length of 20 to 100 $\mu$m), as shown by step 214. The former leads to the positive identification of type *S. Natans* at step 216 and the latter leads to the positive identification of type 1701 at step 218.

Finally, when observed trichome diameter is determined to be greater than 1.0 $\mu$m (decision step 198), type 0041 is positively identified at step 220. When the trichome diameter is less than 1.0 $\mu$m, however, additional characteristics from the sample 108 are required. More particularly, a new set of digital images are provided to the video display 116 at this point to provide the user with graphical illustrations of two mutually exclusive conditions: filament within the floc and extending from the floc, as indicated by step 222; and filament free in solution and extending from the floc, as indicated by step 224. As will be recognized, the floc comprises a flocculent mass formed by certain bacteria, fungi and other biological life forms, as well as inorganic and organic particulate matter. The floc represents the structure formed by the microorganisms, including the filamentous organisms. Hence, the relative configuration of the floe and filamentous organisms is evaluated by the selection of the two options presented by steps 222 and 224.

When the filaments are disposed within the floc and extend from the floc, the user is presented with another selection at decision step 226, namely, whether the cells are square shaped: if so, type 0675 is positively identified (step 228) and if not, type 1701 is positively identified (step 230). On the other hand, when the filaments are free in solution and extend from the floc (step 224), type 0914 is positively identified, as shown by step 232. It will now be noted that the routine of FIG. 3-2 (i.e., selection of attached growth, no sulfur granules) leads to the identification of seven different types of filamentous organisms: 0041, 0675, 0914, 1701, 1851, *H. Hydrossis* and *S. Natans*.

Figures 3, 4:
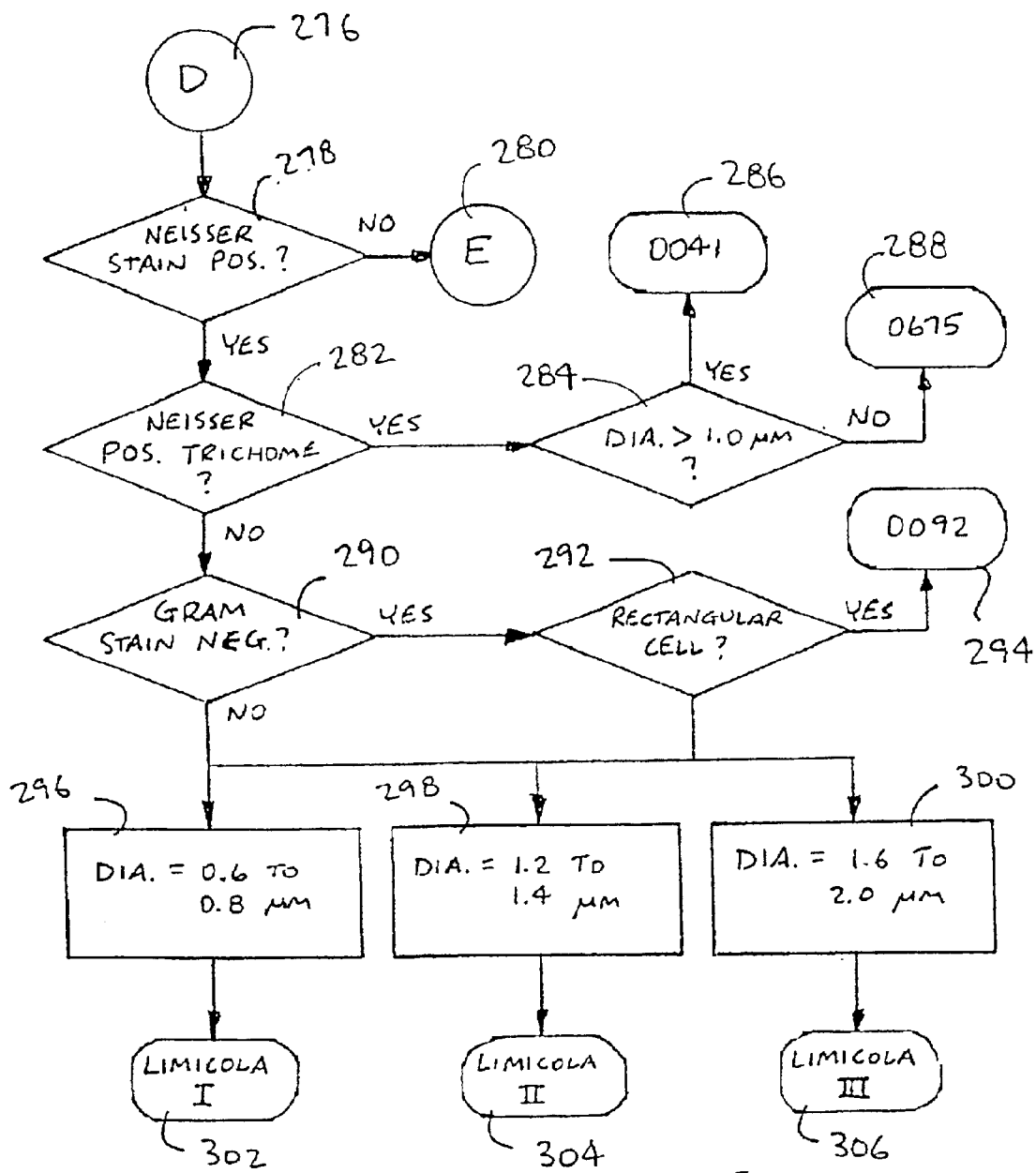
Figures 3, 4, 5:
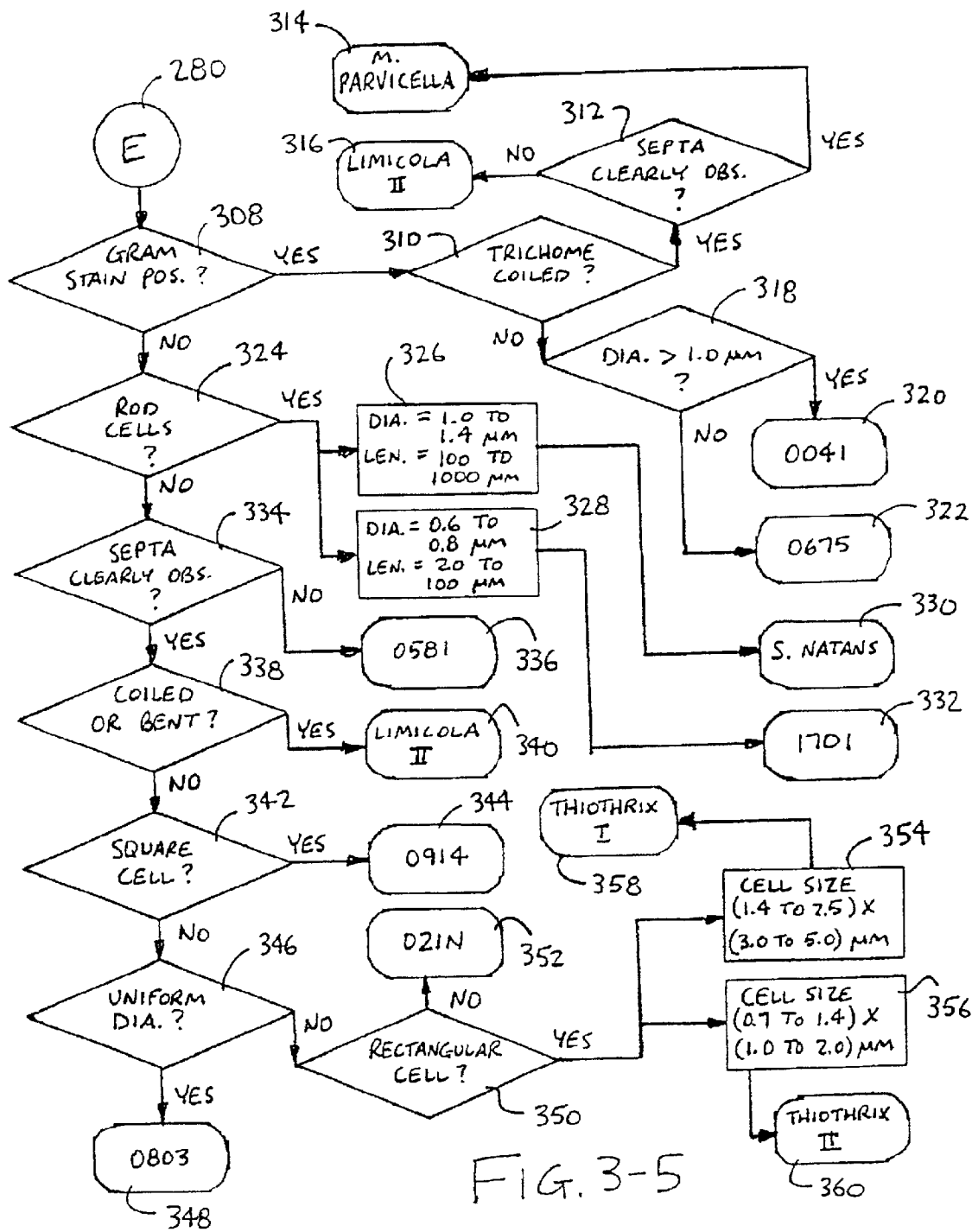

With reference again to FIG. 3, when the user selects from the main screen the no attached growth/no sulfur granules option set forth by step 150, the routine proceeds to FIGS. 3-3 through 3-5. All 23 of the filamentous organism types of Table I are provided in this portion of the routine, because all of these organisms can exist without the presence of either of these two factors.

As shown in FIG. 3-3, the user is provided with a new screen with representative digital images of the following mutually exclusive features from which to select: transparency (decision step 234); branching (decision step 236); motility (decision step 238); rigidly straight (decision step 240); oval cells (decision step 242); and trichome bundles (decision step 244).

Transparency (decision step 234) describes filaments wherein the cells appear not to have any internal structures. In practice, such filaments appear relatively more translucent, as no internal structure is observable, but objects behind the filaments are not clearly visible. Only type 0961 has generally been observed to be present in biological systems; accordingly, when the filamentous organisms appear transparent, the routine positively identifies such as 0961, as indicated by step 246.

Branching (decision step 236) is a characteristic so-called due to the resemblance to the branches of a tree. True branching occurs when there is a contiguous cytoplasm between the branched trichomes. It follows that false branching occurs when there is no contiguous cytoplasm between the trichomes. Nocardia ssp. and fungi are the only filamentous organisms observed in activated sludge to exhibit true branching, although it will be noted that *Nostocoida Limicola* (Limicola II), on rare occasions, may also be observed to have true branching. *S. Natans* is the only filament that has been observed in activated sludge to exhibit false branching. Accordingly, when the branching option at decision step 236 is selected by the user, the routine continues to an inquiry whether the branching is true branching, at decision step 248. Digital images of both true branching and false branching are preferably supplied at this point to aid in this determination.

If the branching is determined to be false, the filamentous organism is identified as type *S. Natans*, step 250. If the branching is true, decision step 252 indicates a request for the user to determine a length of the sample organism; if less than 100 $\mu$m in length (as will usually be the case), the filament is positively identified as type Nocardia, step 254.

Otherwise, the filament is positively identified as type Limicola II, step 256.

Continuing with the options presented in the second screen, the motile inquiry of decision step 238 refers to the ability of the sample organism to move independently, usually by flexing and gliding. Hence, the motile characteristics of the sample organism should be observed at this time. If the sample is determined to be motile, decision step 258 inquires as to the diameter of the organism. A larger (greater than 1.0 $\mu$m) diameter results in the positive identification of type Beggiatoa, step 260, and a smaller (less than 1.0 $\mu$m) diameter results in the positive identification of type Flexibacter, step 262.

If the sample 108 is found to contain rigidly straight filaments, type *H. Hydrossis* is positively identified at step 264. If the sample contains oval cells, the user is prompted to determine whether the length is greater than 50 $\mu$m at decision step 266. If so, type 0411 is positively identified at step 268 and if not, type 1863 is positively identified at step 270.

The final selection of the second screen represented by FIG. 3-3 is whether trichome bundles exist within the sample; if so, type *H. Hydrossis* is positively identified at step 274. If none of the foregoing characteristics are determined to be present in the sample organism, the routine passes to FIG. 3-4 (using connection point 276), where more extensive evaluation techniques are employed.

Based upon the foregoing discussion to this point, it will now be appreciated that of the 23 types of filamentous organisms identified by the routine 140, 17 types can be identified based on easily observed characteristics without the use of staining or other extensive evaluation techniques. However, when a sample fails to evidence any of the multitude of characteristics set forth by FIGS. 3, 3-1, 3-2 and 3-3, then it becomes necessary to perform a Neisser stain upon the sample, as indicated by decision step 278 in FIG. 34. As will be recognized, a Neisser stain involves adding the requisite chemical agents to the sample to provide a visually detectable response in the entire filament or in the intracellular granules. Neisser positive cells generally exhibit a blue-violet color, and Neisser negative cells generally exhibit a light yellow-brown color. The routine 140 displays representative digital images of filamentous organisms having these two responses to aid the user in this determination.

When the Neisser stain operation results in a negative result, the routine passes to FIG. 3-5 using connection point 280 (FIG. 3-5 will be discussed below). On the other hand, a Neisser positive result prompts the user to determine whether the entire trichome exhibits positive Neisser stain, decision step 282. If so, the user is prompted to evaluate the diameter of the sample organism, as indicated by decision step 284. When the diameter exceeds 1.0 $\mu$m, type 0041 is positively identified at step 286, otherwise type 0675 is identified at step 288.

When Neisser positive stain reaction is not observed, the user is prompted to carry out a Gram stain process. Like the Neisser stain, a Gram stain involves addition of chemical agents to invoke a visually detectable chemical reaction with the sample organisms: Gram positive cells emote a deep blue-violet color, while Gram negative cells are generally red.

Hence, returning to the flow of FIG. 3-4, a Gram negative result at decision step 290 prompts a determination at decision step 292 whether the cells exhibit a rectangular shape and, if so, the filamentous organism is positively identified as type 0092 at step 294. On the other hand, when a Gram positive result is obtained, or alternatively when a Gram negative result is obtained in combination with non-rectangular cells, a dimensional analysis of filament diameter is required, as indicated by steps 296, 298 and 300. If the diameter is from 0.6 to 0.8 $\mu$m (step 296), type Limicola I is positively identified at step 302; if the diameter is from 1.2 to 1.4 $\mu$m (step 298), type Limicola II is positively identified at step 304; and if the diameter is from 1.6 to 2.0 $\mu$m (step 300), type Limicola III is positively identified at step 306.

Having concluded the discussion of FIG. 34, reference is now made to FIG. 3-5. As before, representative digital images showing both the presence and the absence of the various characteristics are presented to the user in turn. Initially, the user is prompted to perform a Gram stain upon the sample 108. If a Gram positive result is obtained, decision step 308, the user is next prompted to determine whether coiled trichome are present, decision step 310. If so, the next inquiry is whether the septa are clearly observable in the sample organism, decision step 312. The septa comprises the thin partitions or membranes between the cells in a trichome. Clearly observable septa leads to the positive identification of M. Parvicella at step 314, and the lack of such leads to the positive identification of Limicola II at step 316.

When the trichome are not coiled, the flow passes from decision step 310 to decision step 318, which requires the user to determine whether the diameter is greater than 1.0 $\mu$m. If so, type 0041 is positively identified at step 320, and if not, type 0675 is positively identified at step 322.

Returning to the main flow of FIG. 3-5, when a negative Gram stain result is obtained, decision step 324 prompts the user to observe the filamentous organism for rod cells. If so, a larger and a smaller range of length and width dimensions are set forth by steps 326 and 328, respectively, leading to the respective positive identification of type *S. Natans* at step 330 and type 1701 at step 332.

By selecting the no rod cells option, the routine continues to decision step 334, which inquires whether the septa is clearly observable; if not, positive identification of type 0581 is made at step 336. On the other hand, if the septa is clearly observable, at decision step 338 the user is asked whether the sample filaments exhibit coiled or bent characteristics. If so, positive identification of type Limicola II is provided at step 340.

Continuing with the flow of FIGS. 3–5, the absence of coiled or bent characteristics leads to the prompting of the user at decision step 342 to determine whether the cells are substantially square in shape. When this is true, type 0914 is identified at step 344. When the cells are not square, the next inquiry at decision step 346 inquires as to whether the filamentous organisms exhibit uniform diameters (within each filament). If so, type 0803 is positively identified at step 348. If no such uniformity is observed, decision step 350 inquires whether the cells are rectangular in shape and, if not, the routine proceeds to step 352 where the filamentous organism is positively identified as type 021N. If rectangular cells are present, however, a dimensional analysis is required, as set forth by steps 354 and 356, with the larger type Thiothrix I positively identified at step 358 and the smaller type Thiothrix II positively identified at step 360.

As mentioned above, by initially evaluating the filamentous organism in the sample 108 for the presence or absence of attached growth and sulfur granules, followed by the evaluation of additional, easily observable physical characteristics, 17 of the 23 types of filamentous organisms can be identified without the need for Gram or Neisser staining techniques. The interactive decision trees, combined with the presentation of representative digital images, allows users without extensive training or experience in the art of filament typing to quickly and reliably identify the type or types of filaments present in the sample 108.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for identifying a filamentous organism of the type present in a biological waste water treatment process, comprising the steps of:
   (a) obtaining a magnified image of the filamentous organism to be identified;
   (b) evaluating the magnified image for the presence or absence of attached growth and the presence or absence of sulfur granules, wherein the attached growth comprises bacterial growth which is attached to a sheath of the filamentous organism; and
   (c) executing a computer program which, for each combination of the presence or absence of attached growth and the presence or absence of sulfur granules, provides a separate user interactive search tree, each search tree leading to a different set of possible types of filamentous organisms.

2. The method of claim 1, wherein step (c) comprises identifying the filamentous organism as type 0914, using the search tree associated with the combination of the presence of attached growth and the presence of sulfur granules.

3. The method of claim 1, wherein step (c) comprises identifying the filamentous organism as a selected one of the following types: 0914, 021N, Beggiatoa, Thiothrix I or Thiothrix II, using the search tree associated with the combination of the absence of attached growth and the presence of sulfur granules.

4. The method of claim 3, wherein step (c) further comprises evaluating the filamentous organism for the presence or absence of at least one of the following physical characteristics: square sulfur granules, rectangular granules, motility, a sheath, and variable cell morphology.

5. The method of claim 1, wherein step (c) comprises identifying the filamentous organism as a selected one of the following types: 0041, 0675, 0914, 1701, 1851, *H. Hydrossis* or *S. Natans*, using the search tree associated with the combination of the presence of attached growth and the absence of sulfur granules.

6. The method of claim 5, wherein step (c) further comprises evaluating the filamentous organism for the presence or absence of at least one of the following physical characteristics: sparse and perpendicular growth, square sulfur granules, branching, straightness, rod-shaped cells, and trichome diameter.

7. The method of claim 1, wherein step (c) comprises identifying the filamentous organism as a selected one of the following types: 0041, 0092, 021N, 0411, 0581, 0675, 0803, 0914, 0961, 1701, 1851, 1863, Beggiatoa, Flexibacter, *H. Hydrossis*, Limicola I, Limicola II, Limicola III, *M. Parvicella*, Nocardia ssp., *S. Natans*, Thiothrix I or Thiothrix II, using the search tree associated with the combination of the absence of attached growth and the absence of sulfur granules.

8. The method of claim 7, wherein step (c) further comprises evaluating the filamentous organism for the presence or absence of at least one of the following physical characteristics: transparency, branching, motility, straight filament, straightness, oval cells, and trichome bundles.

9. The method of claim 8, wherein step (c) further comprises performing a Neisser stain of the filamentous organism.

10. The method of claim 8, wherein step (c) further comprises performing a Gram stain of the filamentous organism.

11. A system for identifying a filamentous organism present in a biological waste water treatment process, comprising:
a computer with associated programming to provide a separate user interactive search tree for each combination of presence or absence of attached growth and presence or absence of sulfur granules in a magnified image of the filamentous organism, wherein the attached growth comprises bacterial growth which is attached to a sheath of the filamentous organism, and wherein each search tree leads to a different set of possible types of filamentous or organisms.

12. The system of claim 11, wherein the computer is further provided with an associated video display and wherein the associated programming displays representative digital images of each of the combinations of the presence or absence of attached growth and the presence or absence of sulfur granules.

13. The system of claim 12, further comprising a microscope which generates the magnified image of the filamentous organism, and wherein the magnified image of the filamentous organism is displayed on the video display of the computer while the video display also displays the representative digital images of each of the combinations of the presence or absence of attached growth and the presence or absence of sulfur granules.

14. The system of claim 11, wherein the search the associated with the combination of the presence of attached growth and the presence of sulfur granules results in the identification of the filamentous organism as type 0914.

15. The system of claim 11, wherein the search tree associated with the combination of the absence of attached growth and the presence of sulfur granules results in the identification of the filamentous organism as a selected one of the following types: 0914, 021N, Beggiatoa, Thiothrix I or Thiothrix II.

16. The system of claim 11, wherein the search the associated with the combination of the presence of attached growth and the absence of sulfur granules leads to the identification of the filamentous organism as a selected one of the following types: 0041, 0675, 0914, 1701, 1851, *H. Hydrossis* or *S. Natans*.

17. The system of claim 11, wherein the search tree associated with the combination of the absence of attached growth and the absence of sulfur granules leads to the identification of the filamentous organism as a selected one of tho following types: 0041, 0092, 021N, 0411, 0581, 0675, 0803, 0914, 0961, 1701, 1851, 1863, Beggiatoa, Flexibacter, *H. Hydrossis*, Limicola I, Limicola II, Limicola III, *M. Parvicella*, Nocardia ssp., *S. Natans*, Thiothrix I or Thiothrix II.

* * * * *

UNITED STATES PATENT AND TRADEMARK OFFICE
CERTIFICATE OF CORRECTION

PATENT NO.    : 6,748,331 B1
DATED         : June 8, 2004
INVENTOR(S)   : Zhao et al.

It is certified that error appears in the above-identified patent and that said Letters Patent is hereby corrected as shown below:

Column 7,
Line 6, replace "of the floe" with -- of the floc --

Column 9,
Line 12, replace "FIG 34" with -- FIG 3-4 --

Column 12,
Line 16, replace "the search the" with -- the search tree --

Signed and Sealed this

Third Day of May, 2005

JON W. DUDAS
*Director of the United States Patent and Trademark Office*